US011507166B1

United States Patent
Hobbs et al.

(10) Patent No.: US 11,507,166 B1
(45) Date of Patent: Nov. 22, 2022

(54) MONITORING TOTAL POWER CONSUMPTION OF A COMPONENT COMMUNICABLY COUPLED TO A RISER CARD OF AN INFORMATION HANDLING SYSTEM

(71) Applicant: Dell Products L.P., Round Rock, TX (US)

(72) Inventors: Derric C. Hobbs, Round Rock, TX (US); Eric N. Sendelbach, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/447,763

(22) Filed: Sep. 15, 2021

(51) Int. Cl.
*G06F 1/28* (2006.01)
(52) U.S. Cl.
CPC ...................... *G06F 1/28* (2013.01)
(58) Field of Classification Search
CPC ......................................................... G06F 1/28
See application file for complete search history.

(56) References Cited

U.S. PATENT DOCUMENTS

| 2007/0218709 A1* | 9/2007 | Yang | H05K 1/147 |
| | | | 439/61 |
| 2014/0372783 A1* | 12/2014 | Wade | G06F 1/3206 |
| | | | 713/340 |
| 2016/0139186 A1* | 5/2016 | Hsu | G01R 35/005 |
| | | | 702/64 |
| 2016/0224497 A1* | 8/2016 | Hartman | G06F 13/4022 |
| 2017/0127549 A1* | 5/2017 | Lunsman | H05K 7/1487 |

* cited by examiner

*Primary Examiner* — Mark A Connolly
(74) *Attorney, Agent, or Firm* — McDermott Will & Emery LLP (57) ABSTRACT

In one embodiment, a method for monitoring total power consumption of a component coupled to a riser card includes: capturing, by a power cable sensor, a first signal associated with a power cable; receiving, by a power monitor, the first signal from the power cable sensor via a first bus; determining, by the power monitor, a first power consumption level indicating a first voltage supplied to the component via the power cable; capturing, by a card slot sensor, a second signal associated with a card slot; receiving, by the power monitor, the second signal from the card slot sensor via a second bus; determining, by the power monitor, a second power consumption level indicating a second voltage supplied to the component via the card slot; and determining, by the power monitor, a total power consumption level associated with the component based on the first and the second power consumption levels.

20 Claims, 4 Drawing Sheets

```
┌─────────────────────────────────────────────────────────┐
│ CAPTURE, BY A POWER CABLE SENSOR OF A RISER CARD, A FIRST│
│   SIGNAL ASSOCIATED WITH A POWER CABLE OF A POWER SUPPLY UNIT. │
│                          410                            │
└─────────────────────────────────────────────────────────┘
                              ↓
┌─────────────────────────────────────────────────────────┐
│ RECEIVE, BY A POWER MONITOR OF THE RISER CARD, THE FIRST SIGNAL │
│   FROM THE POWER CABLE SENSOR VIA A FIRST BUS OF THE RISER CARD. │
│                          420                            │
└─────────────────────────────────────────────────────────┘
                              ↓
┌─────────────────────────────────────────────────────────┐
│   DETERMINE, BY THE POWER MONITOR, A FIRST POWER CONSUMPTION │
│        LEVEL ASSOCIATED WITH THE POWER CABLE.           │
│                          430                            │
└─────────────────────────────────────────────────────────┘
                              ↓
┌─────────────────────────────────────────────────────────┐
│   CAPTURE, BY A CARD SLOT SENSOR OF THE RISER CARD, A SECOND │
│         SIGNAL ASSOCIATED WITH A CARD SLOT.             │
│                          440                            │
└─────────────────────────────────────────────────────────┘
                              ↓
┌─────────────────────────────────────────────────────────┐
│   RECEIVE, BY THE POWER MONITOR, THE SECOND SIGNAL FROM THE │
│     CARD SLOT SENSOR VIA A SECOND BUS OF THE RISER CARD.│
│                          450                            │
└─────────────────────────────────────────────────────────┘
                              ↓
┌─────────────────────────────────────────────────────────┐
│      DETERMINE, BY THE POWER MONITOR, A SECOND POWER    │
│       CONSUMPTION LEVEL ASSOCIATED WITH THE CARD SLOT.  │
│                          460                            │
└─────────────────────────────────────────────────────────┘
                              ↓
┌─────────────────────────────────────────────────────────┐
│  DETERMINE, BY THE POWER MONITOR, A TOTAL POWER CONSUMPTION │
│         LEVEL ASSOCIATED WITH THE COMPONENT.            │
│                          470                            │
└─────────────────────────────────────────────────────────┘
```

FIG. 4

MONITORING TOTAL POWER CONSUMPTION OF A COMPONENT COMMUNICABLY COUPLED TO A RISER CARD OF AN INFORMATION HANDLING SYSTEM

BACKGROUND

Field of the Disclosure

The disclosure relates generally to information handling systems, and in particular to monitoring total power consumption of a component communicably coupled to a riser card of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed method for monitoring a total power consumption of a component communicably coupled to a riser card of an information handling system includes: capturing, by a power cable sensor of the riser card, a first signal associated with a power cable of a power supply unit of the information handling system, the power cable sensor disposed on a surface of the riser card proximate to a first cable routing slot of a plurality of cable routing slots of the riser card, the power cable coupled to the component, each of the plurality of cable routing slots disposed proximate to one or more edges of the riser card and configured to route a portion of the power cable; receiving, by a power monitor of the riser card, the first signal from the power cable sensor via a first bus of the riser card, the first bus communicably coupling the power cable sensor to the power monitor; determining, by the power monitor, a first power consumption level associated with the power cable based on the first signal, the first power consumption level indicating a first voltage supplied to the component via the power cable; capturing, by a card slot sensor of the riser card, a second signal associated with a card slot of the information handling system, the card slot sensor disposed on the surface of the riser card proximate to a connector of the riser card, the connector coupling the riser card to the card slot; receiving, by the power monitor, the second signal from the card slot sensor via a second bus of the riser card, the second bus communicably coupling the card slot sensor to the power monitor; determining, by the power monitor, a second power consumption level associated with the card slot based on the second signal, the second power consumption level indicating a second voltage supplied to the component via the card slot; and determining, by the power monitor, a total power consumption level associated with the component based on the first power consumption level and the second power consumption level.

In one or more of the disclosed embodiments, the method further includes: sending, by the power monitor, the total power consumption level to an embedded controller of the information handling system for processing.

In one or more of the disclosed embodiments, the method further includes: suppressing, by a dampening pad of the riser card, a high-frequency noise associated with the power cable, the dampening pad disposed on the surface of the riser card proximate to a second cable routing slot of the plurality of cable routing slots.

In one or more of the disclosed embodiments, determining the first power consumption level associated with the power cable based on the first signal includes: identifying, by the power monitor, an output voltage generated by the power cable sensor, the output voltage included in the first signal; and determining, by the power monitor, the first power consumption level based on the output voltage.

In one or more of the disclosed embodiments, determining the second power consumption level associated with the card slot based on the second signal includes: identifying, by the power monitor, an output current generated by card slot sensor, the output current included in the second signal; and determining, by the power monitor, the second power consumption level based on the output current.

In one or more of the disclosed embodiments, determining the total power consumption level associated with the component based on the first power consumption level and the second power consumption level includes: adding, by the power monitor, the first power consumption level to the second power consumption level.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a method for monitoring a total power consumption of a component communicably coupled to a riser card of an information handling system that includes: capturing, by a power cable sensor of the riser card, a first signal associated with a power cable of a power supply unit of the information handling system, the power cable sensor disposed on a surface of the riser card proximate to a first cable routing slot of a plurality of cable routing slots of the riser card, the power cable coupled to the component, each of the plurality of cable routing slots disposed proximate to one or more edges of the riser card and configured to route a portion of the power cable; receiving, by a power monitor of the riser card, the first signal from the power cable sensor via a first bus of the riser card, the first bus communicably coupling the power cable sensor to the power monitor; determining, by the power monitor, a first power consumption level associated with the power cable based on the first signal, the first power consumption level indicating a first voltage supplied to the component via the power cable; capturing, by a card slot sensor of the riser card, a second signal associated with a card slot of the information handling system, the card slot sensor disposed on the surface of the riser card proximate to a connector of the riser card, the connector coupling the riser card to the card slot; receiving, by the power monitor, the second signal from the card slot sensor via a second bus of the riser card, the second bus communicably coupling the card slot sensor to the power monitor; determining, by the power monitor, a second power consumption level associated with the card slot based on the second signal, the second power consumption level indicating a second voltage supplied to the component via the card slot; and determining, by the power monitor, a total power consumption level associated with the component based on the first power consumption level and the second power consumption level. In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
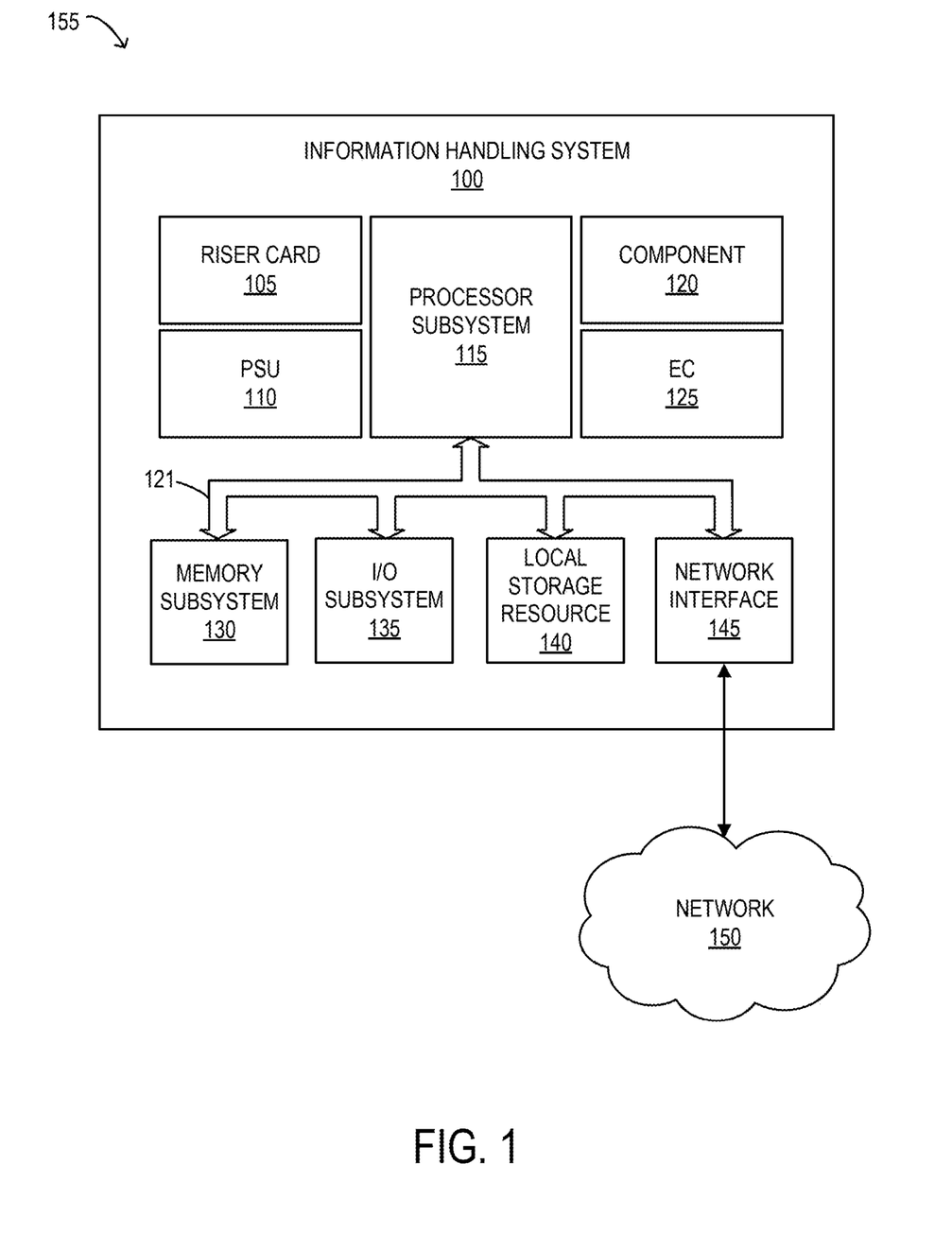
FIG. 1 is a block diagram of selected elements of an embodiment of a computing environment that includes an information handling system.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 115, which may comprise one or more processors, and system bus 121 that communicatively couples various system components to processor subsystem 115 including, for example, a memory subsystem 130, an I/O subsystem 135, a local storage resource 140, and a network interface 145. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, HyperTransport (HT) bus, and Video Electronics Standards Association (VESA) local bus. As shown in FIG. 1, information handling system 100 may additionally include a riser card 105, a power supply unit (PSU) 110, a component 120, and an embedded controller (EC) 125. In other embodiments, computing environment 155 may include additional, fewer, and/or different components than the components shown in FIG. 1.

In information handling system 100, processor subsystem 115 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 115 may interpret and/or execute program instructions and/or process data stored locally (e.g., in memory subsystem 130 and/or another component of information handling system 100). In the same or alternative embodiments, processor subsystem 115 may interpret and/or execute program instructions and/or process data stored remotely. In one embodiment, processor subsystem 115 may be or include a multi-core processor comprised of one or more processing cores disposed upon an integrated circuit (IC) chip. In other embodiments, processor subsystem 115 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 135 may comprise a system, device, or apparatus generally operable to receive and/or transmit data to, from, and/or within information handling system 100. I/O subsystem 135 may represent, for example, a variety of communication interfaces, graphics interfaces, video interfaces, user input interfaces, and/or peripheral interfaces. In various embodiments, I/O subsystem 135 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 140 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 145 may be a suitable system, apparatus, or device operable to serve as an interface between information handling system 100 and a network 150. Network interface 145 may enable information handling system 100 to communicate over network 150 using a suitable transmission protocol and/or standard, including, but not limited to, transmission protocols and/or standards enumerated below with respect to the discussion of network 150. Network 150 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), a Cloud network, an Edge network, an intranet, the Internet or another appropriate architecture or system that facilitates the communication of signals, data and/or messages (generally referred to as data). Network interface 145 may enable wired and/or wireless communications (e.g., NFC or Bluetooth) to and/or from information handling system 100.

In particular embodiments, network 150 may include one or more routers for routing data between client information handling systems 100 and server information handling systems 100. A device (e.g., a client information handling system 100 or a server information handling system 100) on network 150 may be addressed by a corresponding network address including, for example, an Internet protocol (IP) address, an Internet name, a Windows Internet name service (WINS) name, a domain name or other system name. In particular embodiments, network 150 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 150 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 150 and its various components may be implemented using hardware, software, or any combination thereof.

In one embodiment, riser card 105 may be a suitable system, apparatus, or device operable to mount component 120. In particular, riser card 105 may be or include a printed circuit board (PCB) configured to be inserted, or otherwise mounted, within a card slot (e.g., disposed on a motherboard of information handling system 100) in a perpendicular orientation. This perpendicular orientation allows for the mounting of additional components (e.g., component 120) within information handling system 100 without requiring additional space for non-standard mounting within the existing chassis architecture. In one embodiment, riser card 105 may be configured to fit within a Peripheral Component Interconnect Express (PCIe) card slot (e.g., via connector 320 shown in FIG. 3) such that component 120 may be mounted, or otherwise communicably coupled, to riser card 105. For example, component 120 may be mounted, or otherwise communicably coupled, to riser card 105 via an expansion slot disposed on a surface of riser card 105 to receive power via the PCIe card slot. In another embodiment, component 120 may be communicably coupled to riser 105 via one or more board-to-board (BTB) connectors. In other embodiments, riser card 105 may be configured to fit within a Peripheral Component Interconnect (PCI) card slot, an Accelerated Graphics Port (AGP) card slot, an Industrial Standard Architecture (ISA) card slot, and/or any other card slots suitable for mounting component 120. In one embodiment, riser card 105 may be configured to fit within a x1 card slot. In other embodiments, riser card 105 may be configured to fit within a x4 card slot, a x8 card slot, a x16 card slot, a x32 card slot, and/or any other physical configuration of card slot suitable for removably coupling with riser card 105. It is noted that although a single riser card 105 is shown FIG. 1, other embodiments may include any number of riser cards 105 suitable for mounting component 120. In addition, other embodiments of the information handling system 100 may not include riser card 105. In such embodiments, components of information handling system 100 described herein (e.g., component 120, dampening pad 210, power cable sensor 220, card slot sensor 300, power monitor 310, and the like) may be mounted, or otherwise communicably coupled, directly to a mainboard of information handling system 100. Riser card 105 is described in further detail with respect to FIGS. 2A-3.

Figure 2A:
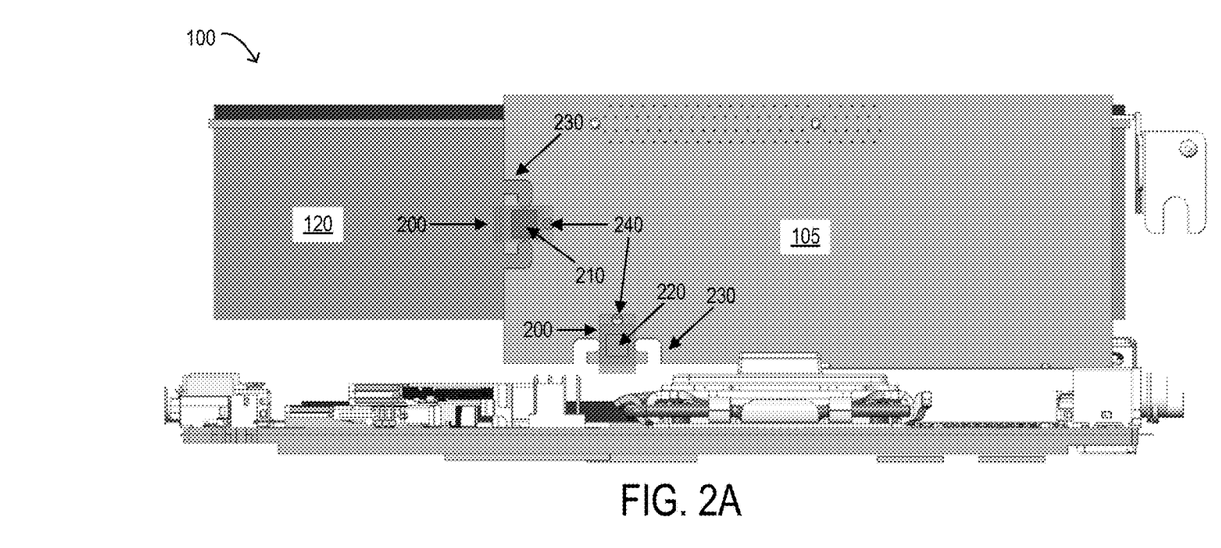
FIGS. 2A and 2B illustrate selected elements of an embodiment of a component communicably coupled to a riser card of an information handling system.

In one embodiment, component 120 may be a suitable system, apparatus, or device operable to support dedicated graphics for information handling system 100. Specifically, component 120 may generate a feed of output images to be displayed to a user of information handling system (e.g., via I/O subsystem 135). In one embodiment, component 120 may be or include a PCB configured to be inserted, or otherwise mounted, within a card slot (e.g., expansion slot) of riser card 105. For example, component 120 may be mounted to an expansion slot disposed on a surface of riser card 105. In one embodiment, component 120 may include a graphics processor unit (GPU), a random-access memory (RAM), and power regulators specifically designed for processing video images to offload processing demands on a central processing unit (CPU) (e.g., processor subsystem 115) of information handling system 100 and system RAM (e.g., memory subsystem 130). However, each of these dedicated components require power to operate, which may contribute to an overall power consumption, or a "total power consumption level," of component 120 (e.g., 75 W, 150 W, and the like).

In one embodiment, component 120 may receive power from both PSU 110 via a power cable (e.g., power cable 250 shown in FIG. 2B) and riser card 105 via a card slot in which riser card 105 is mounted. Here, a total power consumption level of component 120 may be comprised of a ratio between power supplied by PSU 110 and power supplied by riser card 105 via a card slot. For example, component 120 may require a total power consumption level of 150 W to operate and may receive 75 W of this total power consumption level from PSU 110 via a power cable and 75 W of the total power consumption level from riser card 105 via a card slot. Total power consumption level may be increased in higher-end components (e.g., such as graphics cards designed for 3D rendering, gaming, virtual reality (VR), and the like). Thus, component 120 may require a combination of dedicated power sources (e.g., PSU 110 and riser card 105) to satiate total power consumption and ensure reliable operability. Component 120 is described in further detail with respect to FIG. 2A.

In one embodiment, PSU 110 may be a suitable system, apparatus, or device operable to supply, or otherwise provide, power to component 120. In particular, PSU 110 may be or include an electronic hardware device operable to supply, or otherwise provide, power to components within information handling system 100. In one embodiment, PSU 110 may convert alternating current (AC) to a low-voltage, regulated direct current (DC) supplied to internal components of information handling system 100. Here, PSU 110 may supply power to internal components via an auxiliary (AUX) power cable. For example, PSU 110 may be or include a voltage regulator operable to supply power to component 120 via power cable 250 shown in FIG. 2B. In this example, power supplied by PSU 110 via power cable 250 may comprise a portion of the total power consumption level of component 120 as described above.

Figure 2B:
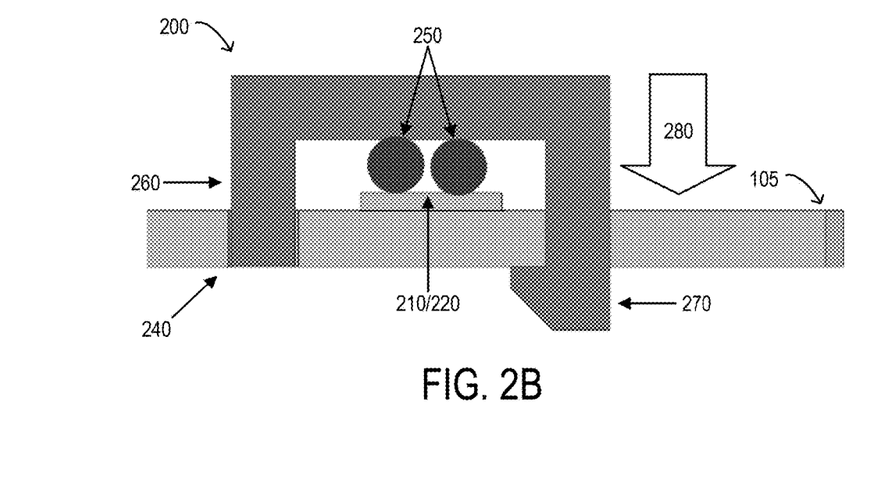

In one embodiment, PSU 110 may include circuitry operable to identify the total power being supplied to components by PSU 110 and to report, or otherwise indicate, the power consumption to information handling system 100. In particular, PSU 110 may include circuitry operable to identify the total power being supplied to component 120 and to report, or otherwise indicate, the power consumption to EC 125. Here, EC 125 may cause changes in power being supplied to one or more components of information handling system 100 based on the power consumption reported, or otherwise indicated, by PSU 110. That is, EC 125 may regulate power being supplied to one or more components of information handling system 100 in accordance with the total power being supplied by PSU 110 to remain within an overall finite power budget associated with information handling system 100. In one embodiment, PSU 110 may be or include a DC power supply. In other embodiments, PSU 110 may be or include a linear power supply, a switched-mode power supply, a capacitive power supply, a linear regulator, an AC power supply, a programmable power supply, an uninterruptible power supply, and/or any other power supply suitable for supplying power to component 120. PSU 110 is described in further detail with respect to FIGS. 2A-3.

In one embodiment, embedded controller (EC) 125 may be a suitable system, apparatus, or device operable to support various system tasks on behalf of information handling system 100. In particular, EC 125 may be or include an electronic hardware device (e.g. a microcontroller) operable to identify a power consumption of respective components within information handling system 100 and to regulate the power consumption to remain within an overall finite power budget associated with information handling system 100. Conventionally, ECs may identify the total power being supplied to components by PSU 110 based on the power consumption reported, or otherwise indicated, the PSU 110 as described above. However, the power consumption reported, or otherwise indicated, by PSU 110 may lack a clear indication of the actual power being consumed by respective components of information handling system 100. That is, the power consumption reported, or otherwise indicated, by PSU 110 may be nebulous, indicating a total power being supplied by PSU 110 while failing to distinguish power being consumed by individual components and/or power received by individual components from multiple power sources (e.g., PSU 110 and card slot). As such, conventional ECs may identify that the overall finite power budget associated with information handling system 100 is at or near capacity, and may erroneously cause decreased performance (e.g., throttling) in one or more components based on the power consumption reported, or otherwise indicated, by PSU 110. For example, a conventional EC may cause throttling in a CPU (i.e., processor subsystem 115) upon identifying that the overall finite power budget associated with information handling system 100 is at capacity based on the power consumption reported, or otherwise indicated, by PSU 110. However, in this example, the component having the power consumption causing the overall finite power budget to be at capacity may not actually be the CPU, thereby resulting in decreased performance that does not necessarily align with optimized power distribution across components.

In contrast, EC 125 may identify the total power being supplied to components by PSU 110 based on power consumption reported, or otherwise indicated, by riser card 105. Specifically, riser card 105 may include circuitry (e.g., power monitor 310 shown in FIG. 3) operable to determine a total power consumption level associated with component 120 and to report, or otherwise indicate, the total power consumption level to EC 125. Thus, the power consumption reported, or otherwise indicated, by riser card 105 to EC 125 may be more granular than the conventional reporting described above, thereby allowing EC 125 to identify the total power consumption level associated with component 120. EC 125 is described in further detail with respect to FIGS. 2A-3.

FIGS. 2A and 2B illustrate selected elements of an embodiment of a component communicably coupled to a riser card of an information handling system. In the embodiment illustrated in FIG. 2A, riser card 105 is communicably coupled to component 120 and includes cable routing slots 230, cable clips 200, guide holes 240, a power cable sensor 220, and a dampening pad 210. In the embodiment illustrated in FIG. 2B, cable clip 200 includes a guide pin 260 and a snapping wedge 270 used to couple power cable 250, or portions thereof, to riser card 105. In other embodiments, riser card 105 may include additional, fewer, and/or different components than the components shown in FIGS. 2A and 2B.

In one embodiment, each cable routing slot 230 (collectively referred to herein as "cable routing slots 230") may be a suitable system, apparatus, or device operable to route a portion of power cable 250. Specifically, cable routing slots 230 may be disposed proximate to one or more edges of riser card 105 such that each cable routing slot 230 may route a portion of power cable 250. Conventionally, power cables (e.g., AUX power cables) may be improperly routed throughout a chassis of information handling system 100, causing blockage in air flow and/or obstructing the operation of fans within the chassis. Such improper routing may result in increased ambient temperatures within the chassis, which may cause damage to one or more components within the chassis as the ambient temperature exceeds thermal thresholds associated with the one or more components. In contrast, each cable routing slot 230 disposed proximate to an edge of riser card 105 may be configured to route a portion of power cable 250. In particular, a portion of power cable 250 may be wound, or coiled, around each cable routing slot 230 such that power cable 250 may be coupled to riser card 105, thereby properly routing power cable 250 to avoid air flow blockage and obstruction of other components within the chassis. In one embodiment, the portion of power cable 250 may be coupled, or otherwise secured, to riser card 105 using cable clips 200. In addition, cable routing slots 230 may ensure an optimal position of power cable 250 in relation to dampening pad 210 and power cable sensor 220. Specifically, cable routing slots 230 may serve to position a respective portion of power cable 250 proximate to dampening pad 210 such that dampening pad 210 may suppress, or otherwise dampen, noise associated with power cable 250 accordingly. Similarly, the position of a respective portion of power cable 250 proximate to power cable sensor 220 may allow power cable sensor 220 to detect the presence and/or magnitude of a magnetic field associated with power cable 250 accordingly. Cable routing slots 230 may additionally ensure that excessive stress is not applied to one or more power connectors (not shown in figure) of component 120.

In one embodiment, each cable clip 200 (collectively referred to herein as "cable clips 200") may be a suitable system, apparatus, or device operable to couple, or otherwise secure, a portion of power cable 250 to riser card 105. In particular, each cable clip 200 may be or include a clipping mechanism comprised of nonferrous material configured to couple, or otherwise secure, portions of power cable 250 to cable routing slots 230 of riser card 105. In one embodiment, each cable clip 200 may include a first end and a second end. As shown in FIG. 2B, the first end of cable clip 200 may include a guide pin 260 contoured to be received by guide hole 240 of riser card 105 such that cable clip 200 may be removably coupled to riser card 105. In addition, the second end of cable clip 200 may include a snapping wedge 270 contoured to couple to an edge of riser card 105. Specifically, snapping wedge 270 may be configured to cause cable clip 200 to apply longitudinal force 280 (shown in FIG. 2B) on the portion of power cable 250 routed within cable routing slot 230. The longitudinal force 280 applied by cable clip 200 on the portion of power cable 250 may removably couple the portion of power cable 250 to riser card 105. This is shown in FIG. 2B where a cross-section of a portion of power cable 250 is shown to be wound, or coiled, around cable routing slot 230 such that the portion of power cable 250 is positioned proximate to power cable sensor 220. In other embodiments, information handling system 100 may not include cable clips 200. In such embodiments, power cable 250 may be coupled to riser card 105 using screws, fasteners, and/or any other type of system, apparatus, or device suitable for coupling, or otherwise securing, power cable 250 to riser card 105.

In one embodiment, power cable sensor 220 may be a suitable system, apparatus, or device operable to capture a signal associated with power cable 250. Specifically, power cable sensor 220 may be or include a hardware sensing device operable to detect a voltage being supplied to component 120 from PSU 110 via power cable 250. In one embodiment, power cable sensor 220 may be or include a Hall effect sensor operable to detect the presence and/or magnitude of a magnetic field associated with power cable 250. Here, power cable sensor 220 may detect a presence of a magnetic field caused by a current flowing through power cable 250. In one embodiment, power cable sensor 220 may generate an output voltage that is proportional to the magnitude of the magnetic field associated with power cable 250. In this embodiment, the output voltage generated by power cable sensor 220 may be used (e.g., by power monitor 310 shown in FIG. 3) to determine a power consumption level of component 120. In another embodiment, power cable sensor 220 may generate an output current that is proportional to the magnitude of the magnetic field associated with power cable 250. In this embodiment, the output current generated by power cable sensor 220 may be used (e.g., by power monitor 310) to determine a power consumption level of component 120. That is, the signal (e.g., voltage and/or current proportional to the magnitude of a magnetic field) captured by power cable sensor 220 may be used to determine a power consumption level indicating a voltage being supplied to component 120 via power cable 250.

Figure 3:
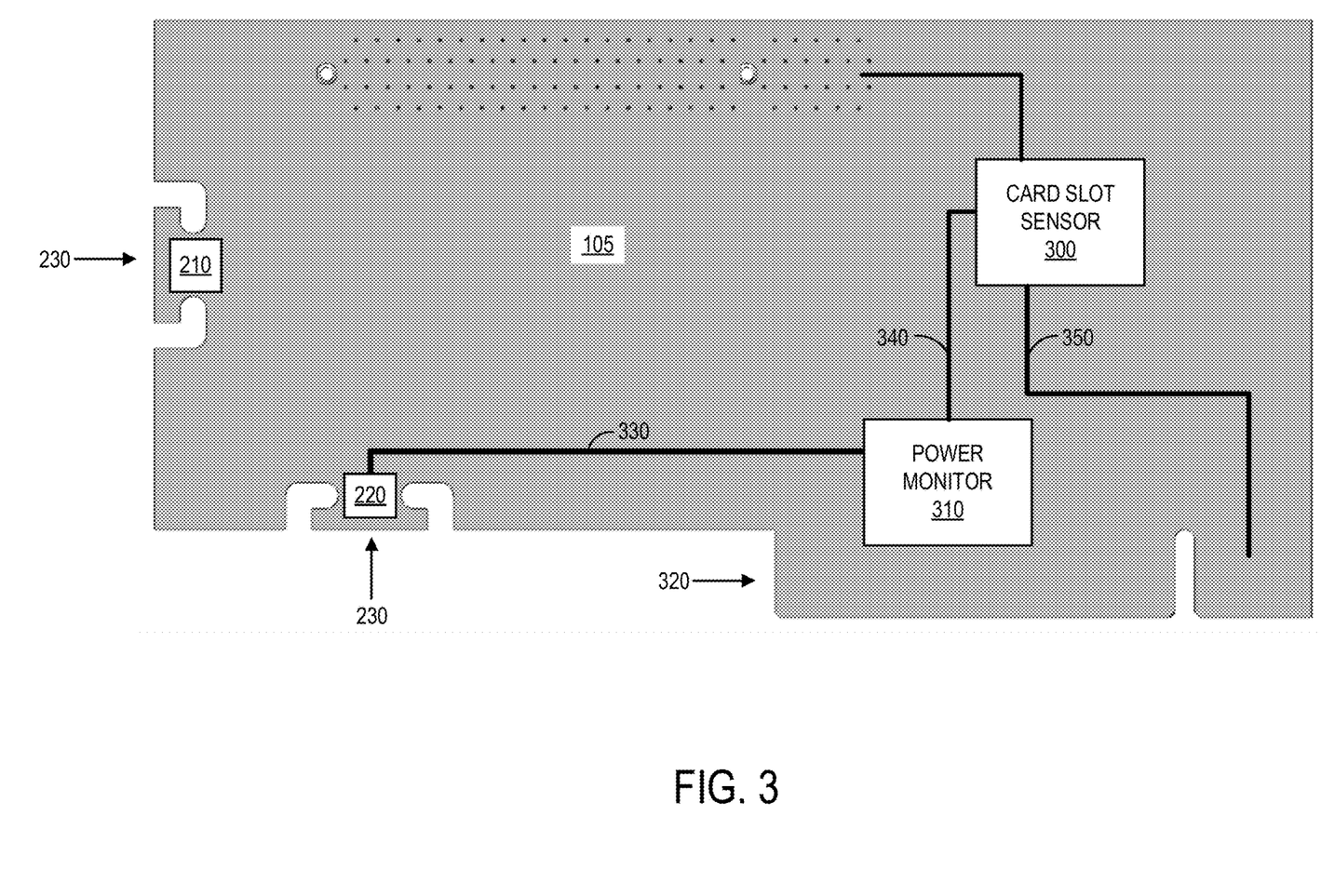
FIG. 3 illustrates selected elements of an embodiment of a riser card of an information handling system.

In the embodiment illustrated in FIGS. 2A and 3, power cable sensor 220 may be disposed on the surface of riser card 105 proximate to cable routing slot 230 such that a portion of power cable 250 that has been wound, or coiled, around cable routing slot 230 may be positioned proximate to power cable sensor 220. In one embodiment, a cable clip 200 may be coupled to riser card 105 proximate to power cable sensor 220 to ensure that power cable sensor 220 may detect the presence and/or magnitude of a magnetic field associated with power cable 250. In particular, cable clip 200 may be positioned proximate to power cable sensor 220 as shown in FIG. 2B. In other embodiments, power cable sensor 220 may be or include a fluxgate sensor, magneto-resistive current sensor, and/or any other type of sensor operable for capturing a signal associated with power cable 250. Power cable sensor 220 is described in further detail with respect to FIG. 3.

In one embodiment, dampening pad 210 may be a suitable system, apparatus, or device operable to suppress, or otherwise dampen, noise associated with power cable 250. In particular, dampening pad 210 may be or include a ferrous material operable to suppress, or otherwise dampen, a high-frequency noise (e.g., switching noise) generated by power cable 250. In the embodiment illustrated in FIGS. 2A and 3, dampening pad 210 may be disposed on the surface of riser card 105 proximate to cable routing slot 230 such that a portion power cable 250 wound, or coiled, around cable routing slot 230 may be positioned proximate to dampening pad 210. In one embodiment, a cable clip 200 may be coupled to riser card 105 proximate to dampening pad 210 to ensure that dampening pad 210 may suppress, or otherwise dampen, a high-frequency noise generated by power cable 250. Specifically, cable clip 200 may be positioned proximate to dampening pad 210 as shown in FIG. 2B. In one embodiment, dampening pad 210 may be or include a pad comprised of cold-rolled steel sheet metal coupled to riser card 105 (e.g., soldered to riser card 105) such that dampening pad 210 may dissipate noise energy in the form of heat. In other embodiments, dampening pad 210 may be or include a pad comprised of alloy steel, carbon steel, cast iron, wrought iron, and/or any other ferrous or conductive material suitable for suppressing noise associated with power cable 250.

FIG. 3 illustrates selected elements of an embodiment of a riser card of an information handling system. In the embodiment illustrated in FIG. 3, riser card 105 includes cable routing slots 230, cable clips 200 (not shown in figure), guide holes 240 (not shown in figure), a power cable sensor 220, and a dampening pad 210 as described above with respect to FIGS. 2A and 2B. In addition, riser card 105 includes card slot sensor 300, power monitor 310, connector 320, and busses 330, 340, and 350. In other embodiments, riser card 105 may include additional, fewer, and/or different components than the components shown in FIG. 3.

In one embodiment, connector 320 may be a suitable system, apparatus, or device operable to couple riser card 105 to a card slot of information handling system 100. In particular, connector 320 may include circuitry operable to communicably couple riser card 105 to a card slot such that riser card 105 may receive power from the card slot. Additionally, riser card 105 may send and/or receive signals, or otherwise communicate, with one or more components (e.g., EC 125) via connector 320. In one embodiment, connector 320 may be comprised of the same material as that of riser card 105. Specifically, connector 320 may be or include a portion of the PCB of riser card 105 configured to be inserted, or otherwise mounted, within a card slot (e.g., disposed on a motherboard of information handling system 100) in a perpendicular orientation. In one embodiment, connector 320 may be configured to fit within a PCIe card slot. In other embodiments, connector 320 may be configured to fit within a PCI card slot, an AGP card slot, an ISA card slot, and/or any other card slots suitable for coupling to riser card 105.

In one embodiment, card slot sensor 300 may be a suitable system, apparatus, or device operable to capture a signal associated with a card slot of information handling system 100. Specifically, card slot sensor 300 may be or include a passive device operable to detect a current being supplied to component 120 from information handling system 100 via a card slot in which riser card 105 is mounted. In the embodiment illustrated in FIG. 3, card slot sensor 300 may be disposed on the surface of riser card 105 proximate to connector 320 such that card slot sensor 300 may receive current from connector 320 via bus 350. In one embodiment, card slot sensor 300 may be or include a shunt device operable to receive a current being supplied to component 120 via a card slot in which riser card 105 is mounted. Here, current flowing through card slot sensor 300 via bus 350 from the card slot may generate a voltage drop across card slot sensor 300. In one embodiment, this voltage drop may be used (e.g., by power monitor 310) to determine a power consumption level of component 120. In one embodiment, the current flowing through card slot sensor 300 via bus 350 from the card slot may be used (e.g., by power monitor 310) to determine the power consumption level of component 120. That is, the signal (e.g., voltage drop and/or current) captured by card slot sensor 300 may be used to determine a power consumption level indicating a voltage being supplied to component 120 via the card slot. In one embodiment, card slot sensor 300 may be or include a shunt resistor. In other embodiments, card slot sensor 300 may be or include a metal film, a full-metal shunt, a four wire shunt, and/or any other shunt device suitable for capturing a signal associated with a card slot.

In one embodiment, power monitor 310 may be a suitable system, apparatus, or device operable to determine a total power consumption level associated with component 120. In particular, power monitor 310 may be or include an electronic hardware device (e.g. a microcontroller) operable to determine a total power consumption level associated with component 120 based on a power consumption level associated with power cable 250 and a power consumption level associated with a card slot in which riser card 105 is mounted. In one embodiment, power cable sensor 220 may capture the signal associated with power cable 250 as described above with respect to FIGS. 2A and 2B. Once captured, power monitor 310 may receive the signal from power cable sensor 220 via bus 330. As shown in FIG. 3, power monitor 310 may be communicably coupled to power cable sensor 220 via bus 330. Upon receiving the signal, power monitor 310 may determine a power consumption level associated with power cable 250 based on the signal. Here, the power consumption level may indicate a voltage being supplied to component 120 via power cable 250.

In one embodiment, power monitor 310 may identify an output voltage generated by power cable sensor 220 and may determine the power consumption level based on the output voltage. For example, power cable sensor 220 may be or include a Hall effect sensor operable to generate an output voltage that is proportional to the magnitude of a magnetic field associated with power cable 250. This output voltage may be included in the signal received by power monitor 310 from power cable sensor 220 such that power monitor 310 may determine the power consumption level based on the output voltage (e.g., based on Ohm's law). In another embodiment, power monitor 310 may identify an output current generated by power cable sensor 220 and may determine the power consumption level based on the output current. For example, power cable sensor 220 may generate an output current that is proportional to the magnitude of the magnetic field associated with power cable 250. This output current may be included in the signal received by power monitor 310 from power cable sensor 220 such that power monitor 310 may determine the power consumption level based on the output current (e.g., based on Ohm's law).

In one embodiment, the output voltage and/or output current included in the signal received by power monitor 310 may require additional processing to determine the power consumption level. Specifically, the output voltage and/or output current generated by power cable sensor 220 may require amplification and/or advanced corrections to compensate for sensor characteristics (e.g., temperature-coefficient corrections). In this embodiment, power monitor 310 may include additional circuitry (high gain amplifier, Schmitt trigger, and the like) and/or software (e.g., lookup table, hash table, and the like) operable to amplify and/or perform temperature-coefficient corrections, respectively.

As described above, card slot sensor 300 may capture a signal associated with the card slot in which riser card 105 is mounted. Once captured, power monitor 310 may receive the signal from card slot sensor 300 via bus 340. As shown in FIG. 3, power monitor 310 may be communicably coupled to card slot sensor 300 via bus 340. Upon receiving the signal, power monitor 310 may determine a power consumption level associated with the card slot based on the signal. Here, the power consumption level may indicate a voltage being supplied to component 120 via the card slot. In one embodiment, power monitor 310 may identify an output current generated by card slot sensor 300 and may determine the power consumption level based on the output current. For example, card slot sensor 300 may be or include a shunt device operable to allow current to flow such that a voltage drop may be generated across card slot sensor 300. This output current may be included in the signal received by power monitor 310 from card slot sensor 300 such that power monitor 310 may determine the power consumption level based on the output current (e.g., based on Ohm's law). In another embodiment, power monitor 310 may identify an output voltage generated by card slot sensor 300 and may determine the power consumption level based on the output voltage. For example, a voltage drop may be generated across card slot sensor 300 as current flows through card slot sensor 300 via bus 350. This output voltage may be included in the signal received by power monitor 310 from card slot sensor 300 such that power monitor 310 may determine the power consumption level based on the output voltage (e.g., based on Ohm's law).

In one embodiment, power monitor 310 may determine a total power consumption level associated with component 120. Specifically, power monitor 310 may determine a total power consumption level associated with component 120 based on the power consumption level associated with power cable 250 and the power consumption level associated with the card slot in which riser card 105 is mounted. In one embodiment, power monitor 310 may add the power consumption level associated with power cable 250 to the power consumption level associated with the card slot in which riser card 105 is mounted to determine the total power consumption level. In this embodiment, power monitor 310 may send the total power consumption level to EC 125 (shown in FIG. 1) for processing. As described above with respect to FIG. 1, EC 125 may regulate power being supplied to one or more components of information handling system 100 in accordance with the total power being supplied by PSU 110 to remain within an overall finite power budget associated with information handling system 100. By receiving the total power consumption level from power monitor 310 explicitly indicating the power being consumed by component 120—rather than relying on the power consumption reported, or otherwise indicated, by PSU 110—EC 125 may limit the power being supplied to component 120 from PSU 110 via power cable 250 and/or the power being supplied from the card slot in accordance with the overall finite power budget associated with information handling system 100. As such, EC 125 may avoid erroneously causing decreased performance (e.g., throttling) in components of information handling system 100, thereby increasing system efficiency and overall user satisfaction. In another embodiment, power monitor 310 may send the total power consumption level associated with power cable 250 and the power consumption level associated with the card slot in which riser card 105 is mounted to EC 125. In this embodiment, EC 125 may determine the total power consumption level associated with component 120 (e.g., by adding the respective power consumption levels) and may limit the power being supplied to component 120 accordingly.

Figure 4:
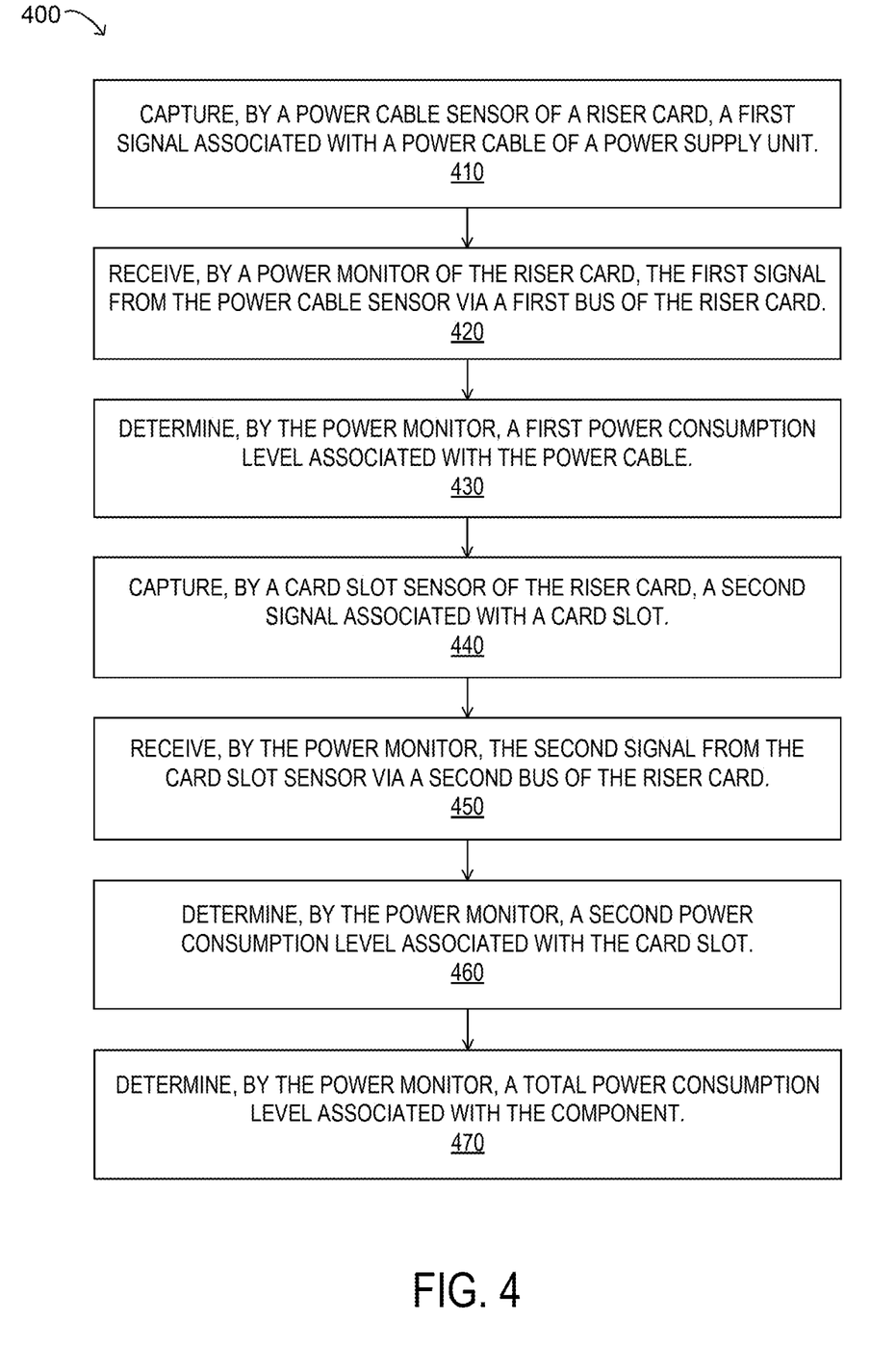
FIG. 4 is a flowchart depicting selected elements of an embodiment of a method for monitoring a total power consumption of a component communicably coupled to a riser card of an information handling system.

FIG. 4 is a flowchart depicting selected elements of an embodiment of a method for monitoring a total power consumption of a component communicably coupled to a riser card of an information handling system. It is noted that certain operations described in method 400 may be optional or may be rearranged in different embodiments.

Method 400 may begin at step 410, where a power cable sensor of the riser card may capture a first signal associated with a power cable of a power supply unit of the information handling system. The power cable sensor may be disposed on a surface of the riser card proximate to a first cable routing slot of a plurality of cable routing slots of the riser card. The power cable may be coupled to the component. Each of the plurality of cable routing slots may be disposed proximate to one or more edges of the riser card and may be configured to route a portion of the power cable. For example, power cable sensor 220 may be disposed on the surface of riser card 105 proximate to cable routing slot 230 such that a portion of power cable 250 that has been wound, or coiled, around cable routing slot 230 may be positioned proximate to power cable sensor 220 as described above with respect to FIGS. 2A and 2B. Power cable sensor 220 may capture a signal associated with power cable 250 such as a presence of a magnetic field caused by a current flowing through power cable 250 as described above with respect to FIGS. 2A and 2B. In step 420, a power monitor of the riser card may receive the first signal from the power cable sensor via a first bus of the riser card. The first bus may communicably couple the power cable sensor to the power monitor. For example, power monitor 310 may receive the signal from power cable sensor 220 via bus 330 communicably coupling power monitor 310 to power cable sensor 220 as described above with respect to FIG. 3. In step 430, the power monitor may determine a first power consumption level associated with the power cable based on the first signal. The first power consumption level may indicate a first voltage supplied to the component via the power cable. For example, power cable sensor 220 may be or include a Hall effect sensor operable to generate an output voltage that is proportional to the magnitude of a magnetic field associated with power cable 250 as described above with respect to FIG. 3. This output voltage may be included in the signal received by power monitor 310 from power cable sensor 220 such that power monitor 310 may determine the power consumption level based on the output voltage (e.g., based on Ohm's law). In step 440, a card slot sensor of the riser card may capture a second signal associated with a card slot of the information handling system. The card slot sensor may be disposed on the surface of the riser card proximate to a connector of the riser card. The connector may couple the riser card to the card slot. For example, card slot sensor 300 may be disposed on the surface of riser card 105 proximate to connector 320 such that card slot sensor 300 may receive current from connector 320 via bus 350 as described above with respect to FIG. 3. In step 450, the power monitor may receive the second signal from the card slot sensor via a second bus of the riser card. The second bus may communicably couple the card slot sensor to the power monitor. For example, power monitor 310 may receive the signal from card slot sensor 300 via bus 340 communicably coupling power monitor 310 to card slot sensor 300 as described above with respect to FIG. 3. In step 460, the power monitor may determine a second power consumption level associated with the card slot based on the second signal. The second power consumption level may indicate a second voltage supplied to the component via the card slot. For example, card slot sensor 300 may be or include a shunt device operable to allow current to flow such that a voltage drop may be generated across card slot sensor 300 as described above with respect to FIG. 3. This output current may be included in the signal received by power monitor 310 from card slot sensor 300 such that power monitor 310 may determine the power consumption level based on the output current (e.g., based on Ohm's law). In step 470, the power monitor may determine a total power consumption level associated with the component based on the first power consumption level and the second power consumption level. For example, power monitor 310 may add the power consumption level associated with power cable 250 to the power consumption level associated with the card slot in which riser card 105 is mounted to determine the total power consumption level as described above with respect to FIG. 3. Here, a total power consumption level of component 120 may be comprised of a ratio between power supplied by PSU 110 and power supplied by riser card 105 via a card slot. For example, component 120 may require a total power consumption level of 150 W to operate and may receive 75 W of this total power consumption level from PSU 110 via power cable 250 and 75 W of the total power consumption level from riser card 105 via a card slot.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for monitoring a total power consumption of a component communicably coupled to a riser card of an information handling system, the method comprising:
    capturing, by a power cable sensor of the riser card, a first signal associated with a power cable of a power supply unit of the information handling system, the power cable sensor disposed on a surface of the riser card proximate to a first cable routing slot of a plurality of cable routing slots of the riser card, the power cable coupled to the component, each of the plurality of cable routing slots disposed proximate to one or more edges of the riser card and configured to route a portion of the power cable;
    receiving, by a power monitor of the riser card, the first signal from the power cable sensor via a first bus of the riser card, the first bus communicably coupling the power cable sensor to the power monitor;
    determining, by the power monitor, a first power consumption level associated with the power cable based on the first signal, the first power consumption level indicating a first voltage supplied to the component via the power cable;
    capturing, by a card slot sensor of the riser card, a second signal associated with a card slot of the information handling system, the card slot sensor disposed on the surface of the riser card proximate to a connector of the riser card, the connector coupling the riser card to the card slot;
    receiving, by the power monitor, the second signal from the card slot sensor via a second bus of the riser card, the second bus communicably coupling the card slot sensor to the power monitor;
    determining, by the power monitor, a second power consumption level associated with the card slot based on the second signal, the second power consumption level indicating a second voltage supplied to the component via the card slot; and
    determining, by the power monitor, a total power consumption level associated with the component based on the first power consumption level and the second power consumption level.

2. The method of claim 1, further comprising:
    sending, by the power monitor, the total power consumption level to an embedded controller of the information handling system for processing.

3. The method of claim 1, further comprising:
    suppressing, by a dampening pad of the riser card, a high-frequency noise associated with the power cable, the dampening pad disposed on the surface of the riser card proximate to a second cable routing slot of the plurality of cable routing slots.

4. The method of claim 1, wherein determining the first power consumption level associated with the power cable based on the first signal comprises:
    identifying, by the power monitor, an output voltage generated by the power cable sensor, the output voltage included in the first signal; and
    determining, by the power monitor, the first power consumption level based on the output voltage.

5. The method of claim 1, wherein determining the second power consumption level associated with the card slot based on the second signal comprises:
    identifying, by the power monitor, an output current generated by card slot sensor, the output current included in the second signal; and determining, by the power monitor, the second power consumption level based on the output current.

6. The method of claim 1, wherein determining the total power consumption level associated with the component based on the first power consumption level and the second power consumption level comprises:
adding, by the power monitor, the first power consumption level to the second power consumption level.

7. An information handling system, comprising:
at least one processor;
a power supply unit including a power cable;
a component coupled to the power cable; and
a riser card communicably coupled to the component, the riser card including:
a plurality of cable routing slots disposed proximate to one or more edges of the riser card, each of the plurality of cable routing slots configured to route a portion of the power cable;
a power cable sensor disposed on a surface of the riser card proximate to a first cable routing slot of the plurality of cable routing slots, the power cable sensor configured to capture a first signal associated with the power cable;
a card slot sensor disposed on the surface of the riser card proximate to a connector of the riser card, the connector coupling the riser card to a card slot of the information handling system, the card slot sensor configured to capture a second signal associated with the card slot;
a power monitor communicably coupled to the power cable sensor and the card slot sensor, the power monitor configured to:
receive the first signal from the power cable sensor via a first bus of the riser card, the first bus communicably coupling the power cable sensor to the power monitor;
determine a first power consumption level associated with the power cable based on the first signal, the first power consumption level indicating a first voltage supplied to the component via the power cable;
receive the second signal from the card slot sensor via a second bus of the riser card, the second bus communicably coupling the card slot sensor to the power monitor;
determine a second power consumption level associated with the card slot based on the second signal, the second power consumption level indicating a second voltage supplied to the component via the card slot; and
determine a total power consumption level associated with the component based on the first power consumption level and the second power consumption level.

8. The information handling system of claim 7, wherein the information handling system is further configured to:
send, by the power monitor, the total power consumption level to an embedded controller of the information handling system for processing.

9. The information handling system of claim 7, wherein the riser card further includes:
a dampening pad disposed on the surface of the riser card proximate to a second cable routing slot of the plurality of cable routing slots, the dampening pad configured to suppress a high-frequency noise associated with the power cable.

10. The information handling system of claim 7, wherein the riser card further includes:
a plurality of cable clips coupled to the plurality of cable routing slots, each of the plurality of cable clips including:
a first end including a guide pin contoured to be received by a guide hole of the riser card, the guide pin configured to couple the cable clip to the riser card; and
a second end including a snapping wedge contoured to couple to an edge of the one or more edges of the riser card, the snapping wedge configured to cause the cable clip to apply a longitudinal force on the portion of the power cable to couple the portion of the power cable to the riser card.

11. The information handling system of claim 10, wherein the portion of the power cable coupled to the riser card is positioned proximate to the power cable sensor.

12. The information handling system of claim 7, wherein to determine the first power consumption level associated with the power cable based on the first signal, the information handling system is further configured to:
identify, by the power monitor, an output voltage generated by the power cable sensor, the output voltage included in the first signal; and
determine, by the power monitor, the first power consumption level based on the output voltage.

13. The information handling system of claim 7, wherein to determine the second power consumption level associated with the card slot based on the second signal, the information handling system is further configured to:
identify, by the power monitor, an output current generated by the card slot sensor, the output current included in the second signal; and
determine, by the power monitor, the second power consumption level based on the output current.

14. The information handling system of claim 7, wherein to determine the total power consumption level associated with the component, the information handling system is further configured to:
add, by the power monitor, the first power consumption level to the second power consumption level.

15. A computing environment, comprising:
an information handling system including one or more processors and a riser card communicably coupled to a component; and
one or more computer-readable non-transitory storage media coupled to one or more of the processors and comprising instructions operable when executed by one or more of the processors to cause the system to:
capture, by a power cable sensor of the riser card, a first signal associated with a power cable of a power supply unit of the information handling system, the power cable sensor disposed on a surface of the riser card proximate to a first cable routing slot of a plurality of cable routing slots of the riser card, the power cable coupled to the component, each of the plurality of cable routing slots disposed proximate to one or more edges of the riser card and configured to route a portion of the power cable;
receive, by a power monitor of the riser card, the first signal from the power cable sensor via a first bus of the riser card, the first bus communicably coupling the power cable sensor to the power monitor;
determine, by the power monitor, a first power consumption level associated with the power cable based on the first signal, the first power consumption level indicating a first voltage supplied to the component via the power cable;

capture, by a card slot sensor of the riser card, a second signal associated with a card slot of the information handling system, the card slot sensor disposed on the surface of the riser card proximate to a connector of the riser card, the connector coupling the riser card to the card slot;

receive, by the power monitor, the second signal from the card slot sensor via a second bus of the riser card, the second bus communicably coupling the card slot sensor to the power monitor;

determine, by the power monitor, a second power consumption level associated with the card slot based on the second signal, the second power consumption level indicating a second voltage supplied to the component via the card slot; and determine, by the power monitor, a total power consumption level associated with the component based on the first power consumption level and the second power consumption level.

16. The computing environment of claim 15, wherein the processors are further operable when executed to:

send, by the power monitor, the total power consumption level to an embedded controller of the information handling system for processing.

17. The computing environment of claim 15, wherein the processors are further operable when executed to:

suppress, by a dampening pad of the riser card, a high-frequency noise associated with the power cable, the dampening pad disposed on the surface of the riser card proximate to a second cable routing slot of the plurality of cable routing slots.

18. The computing environment of claim 15, wherein to determine the first power consumption level associated with the power cable based on the first signal, the processors are further operable when executed to:

identify, by the power monitor, an output voltage generated by the power cable sensor, the output voltage included in the first signal; and determine, by the power monitor, the first power consumption level based on the output voltage.

19. The computing environment of claim 15, wherein to determine the second power consumption level associated with the card slot based on the second signal, the processors are further operable when executed to:

identify, by the power monitor, an output current generated by the card slot sensor, the output current included in the second signal; and determine, by the power monitor, the second power consumption level based on the output current.

20. The computing environment of claim 15, wherein to determine the total power consumption level associated with the component, the processors are further operable when executed to:

add, by the power monitor, the first power consumption level to the second power consumption level.

* * * * *